Figure 1:
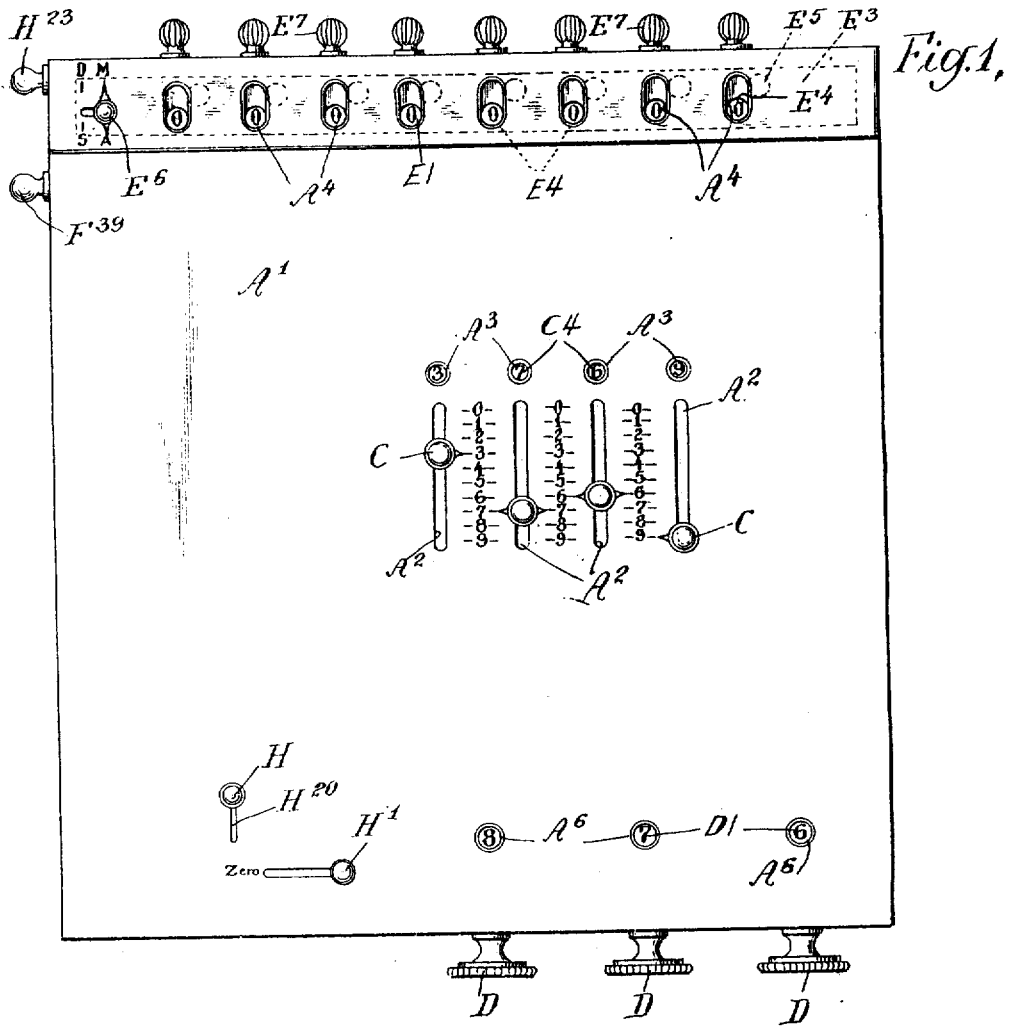

L. W. ROSENTHAL.
CALCULATING MACHINE.
APPLICATION FILED MAY 29, 1911. RENEWED MAR. 13, 1917.

1,237,822.

Patented Aug. 21, 1917.
4 SHEETS—SHEET 1.

Witnesses:
Minerva Lobel
Marie Agnes Bell

Inventor
Leon W. Rosenthal
By his Attorneys
Pennie, Davis & Goldsbrough

L. W. ROSENTHAL.
CALCULATING MACHINE.
APPLICATION FILED MAY 29, 1911. RENEWED MAR. 13, 1917.
1,237,822.
Patented Aug. 21, 1917.
4 SHEETS—SHEET 2.
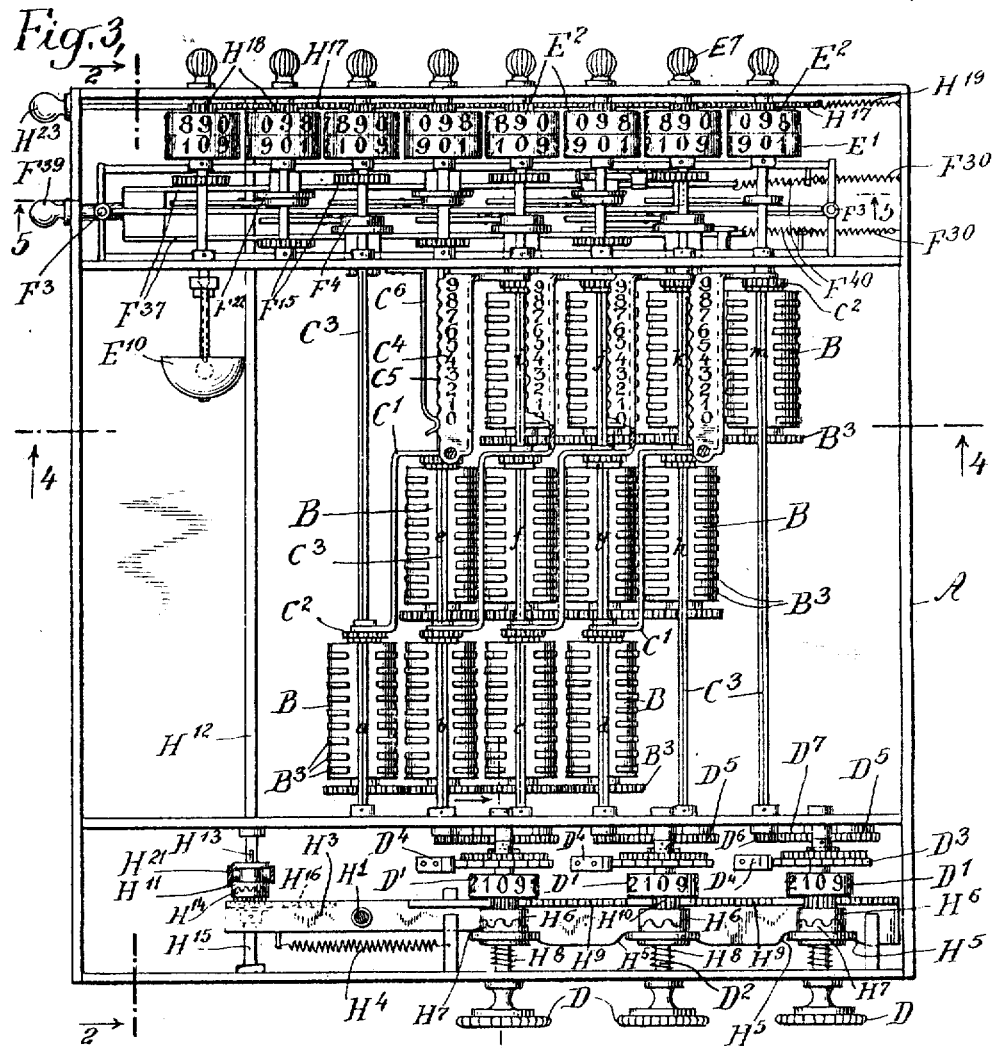
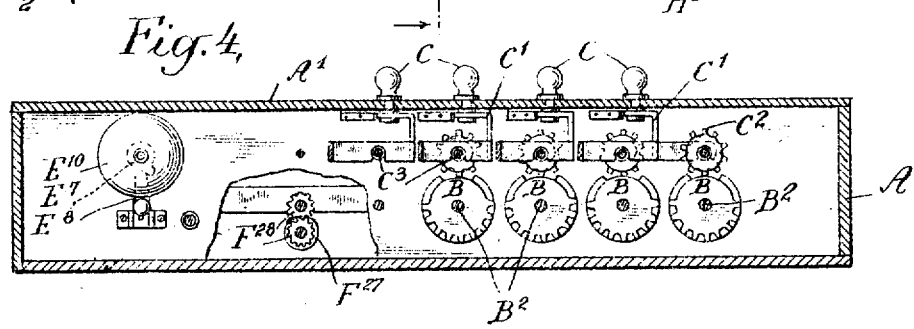
Witnesses:
Minerva Lobel
Marie Agnes Bill
Inventor
Leon W. Rosenthal
By his Attorneys
Pennie, Davis & Goldsborough L. W. ROSENTHAL.
CALCULATING MACHINE.
APPLICATION FILED MAY 29, 1911. RENEWED MAR. 13, 1917.
1,237,822.
Patented Aug. 21, 1917.
4 SHEETS—SHEET 3.
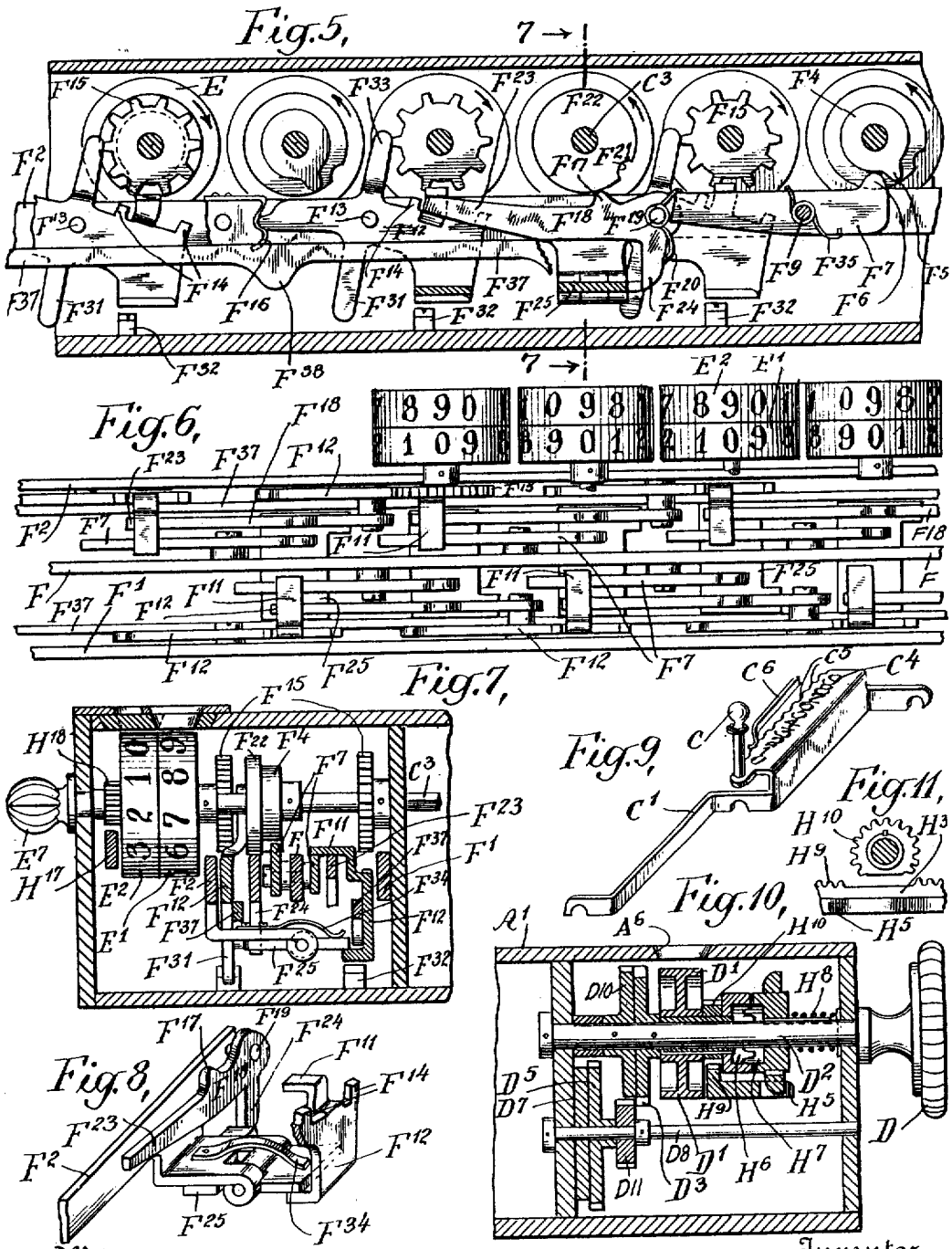

L. W. ROSENTHAL.
CALCULATING MACHINE.
APPLICATION FILED MAY 29, 1911. RENEWED MAR. 13, 1917.
1,237,822.
Patented Aug. 21, 1917.
4 SHEETS—SHEET 4.
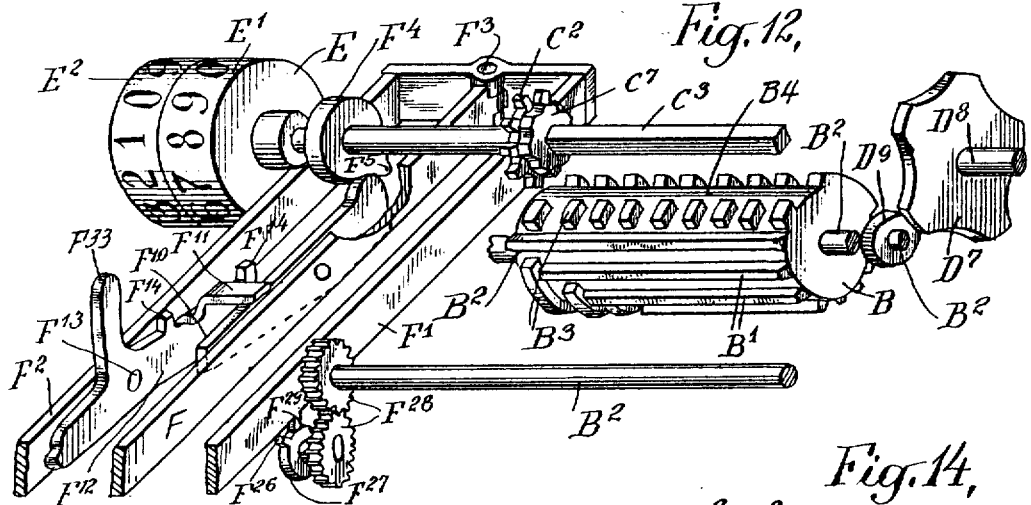
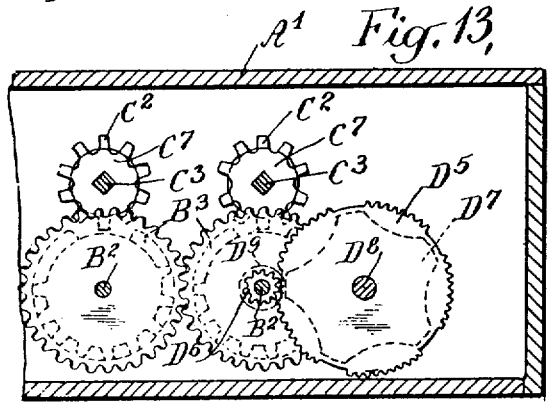
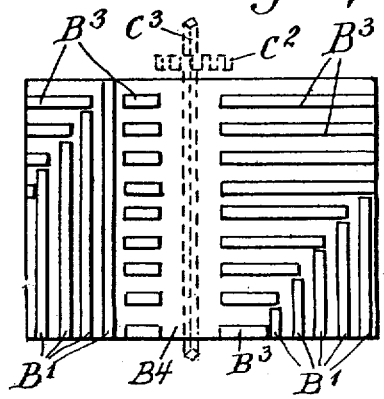
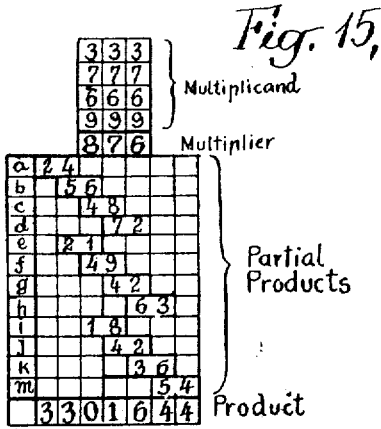
Witnesses:
Minerva Lobel
Marie Agnes Bill
Inventor
Leon W. Rosenthal
By his Attorneys
Pennie, Davis & Goldsborough

UNITED STATES PATENT OFFICE.

LEON W. ROSENTHAL, OF NEW YORK, N. Y.

CALCULATING-MACHINE.

1,237,822.  Specification of Letters Patent.  Patented Aug. 21, 1917.

Application filed May 29, 1911, Serial No. 630,162. Renewed March 13, 1917. Serial No. 154,595.

*To all whom it may concern:*

Be it known that I, LEON W. ROSENTHAL, a citizen of the United States, and resident of No. 240 West 137th street, in the city, county, and State of New York, have invented certain new and useful Improvements in Calculating-Machines; and I do hereby declare the following to be a full, clear, and exact description of the invention, such as will enable others skilled in the art to which it appertains to make and use the same.

The present invention relates to calculating machines and particularly to one adapted to mechanically perform multiplication, division, addition and subtraction of any numbers, and for any sequence and value of the digits in any of the numbers.

One object is to provide a calculating machine comprising a multiplying mechanism permanently connected in proper denominational relation to an adding mechanism, whereby multiplication and division may be performed without employing a step-by-step carriage to effect indentation.

Another object is to provide a multiplying machine wherein one factor is first set up and then the product obtained as the other factor is set up; and wherein successive products may be registered or totalized, as desired.

Another object is to provide a dividing machine wherein the dividend and divisor are first completely set up and then the digits of the quotient determined one at a time.

Another object is to provide an adding machine wherein each number is set up and then added to the total by a single operation; and wherein several numbers may be successively added in a corresponding number of operations.

Another object is to provide a subtracting machine wherein the minuend and subtrahend are first set up, and then their difference registered by a single operation; and wherein several numbers may be successively subtracted in a corresponding number of operations.

Another object is to provide a transfer mechanism adapted to transfer units to result indicators of next higher denominations, and to be set for successive transfers before a unit is carried, whereby the transfer operation may be completed in a rapid manner.

Another object is to provide means for locking the actuators and the registering devices during limited periods of operation of the machine, whereby overthrow of the result indicators is prevented.

Other desirable objects in construction and operation will be made apparent in the following description and will be specifically pointed out in the appended claims.

Multiplication may be performed by two general methods; to wit, by adding in proper denominational relation the products of the separate multiplicand and multiplier digits, or by adding in proper denominational relation the multiplicand factor a number of times equal to the units in each digit of the multiplier. Both methods require that the partial results be added in proper denominational relation. This may be accomplished by employing a step-by-step carriage to properly effect indentation of the successive results, or by providing separate means for registering each partial result in its proper denominational relation, whereby the step-by-step carriage may be dispensed with.

Both of the above methods of performing multiplication have been used heretofore but, so far as I am aware, all prior machines use one method or the other in such manner that a step-by-step carriage must be employed to effect indentation. The resulting intermittent action interferes with the speed of operation and gives rise to a variety of dissimilar movements, whereby exactness in construction of the machine is essential on account of disengagement and subsequent engagement of parts. Furthermore, in order to avoid complicated construction, practically all commercial multiplying machines require that one factor be set up intermittently digit by digit, so that the operation is comparatively slow and tedious besides requiring a certain amount of skill and diligence.

Considered in its broad aspect, my invention embodies a non-indenting adding mechanism of any suitable form, that is an adding mechanism which is not shifted in denomination step-by-step to effect indentation of the partial results. My invention also embodies a plurality of non-indenting registering devices and actuating means therefor, of any suitable form, in combination with means for relatively positioning the registering devices and actuating means in accordance with the digits of the multiplicand factor, thereby constituting a multiplying mechanism. And furthermore, my invention embodies means for selecting a series of indicators of the adding mechanism in accordance with the denomination of each digit of the multiplier factor, and mechanism for actuating the registering devices to advance each series of indicators in accordance with the product of the multiplicand factor and the multiplier digit corresponding to that series. In this way, the partial results are registered by the multiplying mechanism in proper denominational relation on the adding mechanism and added thereon to indicate the complete product of the multiplicand and multiplier factors at the end of the operation without employing a step-by-step carriage to effect indentation of denomination of the partial results. The factors may have one or more digits up to the number provided for, and the digits may have any value and any sequence. The broad claims of this application are intended to cover the broad aspect of the invention hereinbefore set forth, while the specific claims are directed to the specific embodiment shown and described wherein in multiplication the multiplicand factor is successively added in proper denominational relation on the adding mechanism a number of times equal to the number of units of each digit of the multiplier factor. In my co-pending application, Serial No. 621,874, filed April 18, 1911, the specific claims are directed to the specific embodiment shown and described therein, in which all products of the elementary digits 0 to 9 are represented by actuating means embodied in the multiplying mechanism, and in which the separate digits of the products of the separate multiplicand and multiplier digits are added in proper denominational relation on the adding mechanism to give the complete product in multiplication.

The machine herein disclosed as an embodiment within my invention operates according to a novel modification of the ordinary process of multiplication, which so far as I am aware, has never before been used in machines wherein the product or quotient is obtained mechanically, except in my co-pending application Serial No. 621,874, filed April 18, 1911, and which has not been used in computing apparatus of any kind except in my co-pending application Serial No. 460,872, filed November 3, 1908. Briefly stated, in multiplication, this method involves setting up one factor to be multiplied as many times as there are digits in the other factor to be multiplied, multiplying each digit set up by each digit of the other factor, and adding all the separate products in proper denominational relation. In division this method involves setting up the dividend on an adding mechanism, setting up the divisor in proper denominational relation to the dividend as many times as the number of digits desired in the quotient, and then successively substracting each divisor set up as may times as there are units in the respective digits of the quotient. The method is illustrated in Fig. 15 for the multiplication of any two factors such as 3769 and 876, giving a product of 3,301,644; and in Fig. 16 for the division of any two numbers such as 3,301,644 and 3769, giving a quotient of 876 without any remainder. In Fig. 15 the digits 3, 7, 6 and 9, are each shown in three columns, since there are three digits in the multiplier, so that each column contains the multiplicand factor 3769. Now by adding in proper denominational relation all the separate products of the separate digits of each column and one of the digits, 8, 7, or 6, the product 3,301,644 is obtained, as shown. In Fig. 16 the divisor 3769 is shown in three columns since three digits are required in the quotient. Now by successively substracting each column in proper denominational relation from the dividend 3,301,644 as many times as there are units in the respective digits of the quotient, 8, 7, and 6, the remainder is found to be 0, as shown, whereby it is known that 3,301,644 is divided by 3769 exactly 876 times.

In multiplication the multiplicand digits may be arranged in columns from top to bottom to form the multiplicand factor, as shown, or in rows from side to side, in which case the multiplier digits would be placed at one side instead of at the bottom. The multiplicand digits may be placed in any order in either of these arrangements, either similarly or dissimilarly, the only essential condition being that each column or a row includes all the multiplicand digits. Also the multiplier digits may be arranged in any order, the only essential condition being that all the digits of the multiplier factor be shown. Furthermore the digits of each column or a row may be multiplied collectively, in groups or successively, provided that all the separate products are obtained; and the columns or rows may be operated on collectively, in groups or successively according to any order whatsoever. The only essential conditions of the entire combination and the method of operation are that each multiplicand digit be multiplied once and only once by each digit of the multiplier, and that the separate products be added in proper denominational relation. The essential conditions of the combination and method of operation in division will be now obvious from Fig. 16. By this method multiplication may be mechanically performed either by duplicating a proper number of times the separate means for representing all the elementary multiples of the digits 0 to 9, and by providing further means for adding in proper denominational relation those multiples which are predetermined in accordance with the separate digits of the factors to be multiplied together, as specifically shown in my co-pending application Serial No. 621,874 above noted; or by duplicating a proper number of times the separate means for multiplying all the digits of one factor to be multiplied by each digit of the other factor to be multiplied, and by providing further means for adding all the separate products in proper denominational relation, as specifically shown herein. A machine operating on either one of these principles may be readily adapted to perform division by the method above noted. Addition and subtraction may also be mechanically performed by a machine operating in accordance with this method since addition may be regarded as finding the sum of the products of each number and 1, while subtraction may be regarded as taking the difference of the minuend and the product of the subtrahend and 1.

A machine may be built in accordance with this invention for any number of digits in any of the numbers to be operated upon, and a machine so constructed will perform equally well the operations on any numbers having a number of digits less than its particular capacity. The machine herein shown has a capacity in multiplication of four digits in the multiplicand and three digits in the multiplier, whereby the limiting factors are 9,999 and 999.

In the machine herein shown, as an example of the method embodied in this invention, each actuator is rotatable and has disposed circumferentially on its outer periphery a series of progressively stepped teeth arranged parallel to each other and to the axis of the actuator, a blank space between the ends of the series of teeth for the purpose of transferring units to the result indicators of next higher denominations, and stops for preventing overthrow of the registering devices. The series of teeth consists of a blank space representing 0, and nine teeth representing in length the nine digits 1 to 9, as is well known. There are twelve of such actuators arranged in three groups wherein each group comprises four actuators side by side and adapted to be rotated in opposite directions through like extents. Those actuators which effect actuation of the same result indicators are arranged in the same line, and the respective registering devices are mounted on the same shaft. The actuators which control the same result indicators are rotated successively, while those actuators of the same group are operated simultaneously.

Upon setting up each multiplicand digit in the machine herein shown, registering devices equal in number to the number of digits in the limiting multiplier are collectively moved axially of the actuators until each is adapted to engage a number of teeth in one rotation of its respective actuator equal to the digit set up. Hence, by setting up all the digits of the multiplicand in this way, the factor is set up a number of times equal to the number of digits in the limiting multiplier, so that it is then only necessary to rotate each group of actuators, on which the complete multiplicand is set up, through a number of rotations equal to the units in the respective multiplier digit. By using all the multiplier digits in this way, each multiplicand digit is multiplied by each multiplier digit, and upon adding the products of the separate digits in proper denominational relation on the adding mechanism, the product of the multiplicand and multiplier is registered.

The separate groups of actuators are operated successively in accordance with the respective multiplier digits, whereby the number of successive operations equals the number of digits in the multiplier factor. By providing a blank space on each actuator and then properly disposing the registering devices and the transfer mechanism relatively to the actuator teeth, the units are transferred to the result indicators of next higher denominations at times when the partial products are not registered. Transfer mechanism having delayed action is used and means are provided for setting the transfer mechanism for successive transfers from the indicator of lowest denomination to the one of highest denomination before a unit is transferred, and then all the units are transferred simultaneously. Each result indicator has two lines of digits consecutively arranged in opposite directions, so that the digits progressively increase when the line for multiplication and addition is exposed to view while the digits progressively decrease when the line for division and subtraction is exposed to view.

Means are provided for clearing the multiplier and result indicators, but the registering devices are retained in the position to which they were previously set. Means are also provided for retaining the result indicators in the position to which they were actuated, while the multiplier indicators are cleared, so that addition and subtraction may be conveniently performed and so that a series of products may be totalized. Overthrow of the result indicators is prevented by stopping and locking the actuators and the registering devices after each digital actuation.

Figure 2:
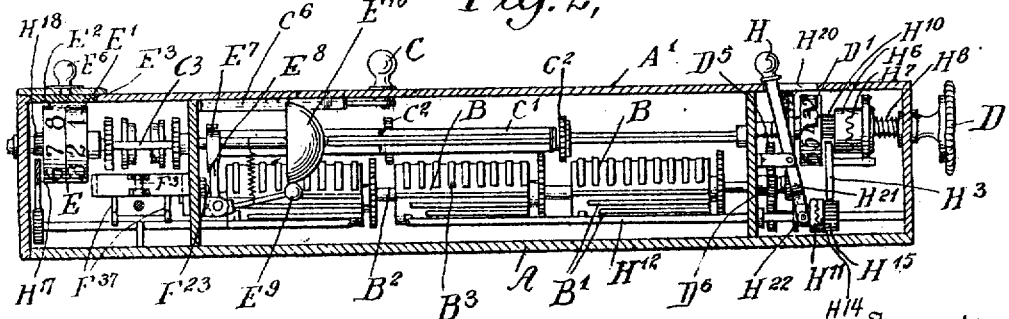

In the accompanying drawings showing, as an example, an embodiment of my invention, Figure 1 is a top view of the machine, with some of the mechanism shown in dotted lines, illustrating the manner of indicating the factors and the product after a problem in multiplication has been completed; Fig. 2 is a vertical elevation on section line 2—2 of Fig. 3; Fig. 3 is a plan view of the machine with the cover removed; Fig. 4 is a vertical elevation, partly broken away, on section line 4—4 of Fig. 3; Fig. 5 is an enlarged vertical elevation on section line 5—5 of Fig. 3, showing a part of the transfer mechanism; Fig. 6 is a plan view of Fig. 5, with some of the parts omitted; Fig. 7 is a vertical elevation on section line 7—7 of Fig. 5; Fig. 8 is a perspective view of a part of the transfer mechanism; Fig. 9 is a perspective view of a carriage for setting up the registering devices; Fig. 10 is an enlarged view of a part of an operating member; Fig. 11 shows a mutilated gear and a part of the member for clearing the multiplier indicators; Fig. 12 is an enlarged perspective view of the actuating registering and transfer mechanism; Fig. 13 illustrates the manner of operating the actuators; Fig. 14 is a development of an actuator; Fig. 15 is an example illustrating the herein disclosed method of multiplication upon which the machine is based; and Fig. 16 is an example illustrating the herein disclosed method of division, upon which the machine is based.

The mechanism is inclosed in a suitable box A having a cover $A^1$ provided with apertures to expose to view the numbers set up and the result, and openings for the actuating devices which connect with the mechanism inside, for the purposes hereinafter described.

The multiplying mechanism comprises the means by which the registering devices are actuated in accordance with the products of the separate digits of the factors to be multiplied, while the adding mechanism comprises the result indicators for adding the partial products, and the transfer mechanism for transferring units to the indicators of next higher denominations. The two mechanisms are permanently connected together in proper denominational relation by transmitting connections. In the machine herein shown the multiplying mechanism comprises the actuators, the registering devices actuated thereby after being set up in accordance with the digits of one factor to be multiplied, and the operating members for operating the actuators in accordance with the digits of the other factor to be multiplied, while each transmitting connection consists of a shaft on which the registering devices and the result indicators of like denomination are mounted.

The number of actuators B in the machine herein shown is equal to the product of the number of digits in the limiting multiplicand and mutliplier factors, or twelve as given by the product of 4 and 3. The actuators have the form of cylinders and are arranged in one plane in three groups or rows, each group containing four actuators. The groups are indented or offset in such a manner that the actuators of the several groups which directly actuate the same result indicator are in the same line in Fig. 3, corresponding to the columns of Figs. 15 and 16, as noted by the letters $a$, $b$, $c$, etc.; whereby the actuators and the registering devices are arranged in proper denominational relation with the result indicators.

In accordance with the method of calculation herein disclosed, the actuators may have various other forms; they may be curved or flat or may have a plurality of faces such as a prism or a pyramid, or they may comprise a support of any other suitable form such as a belt, endless chain or a plane surface. Furthermore the actuators may have various other relative arrangements; they may just as well be indented in a direction the reverse of that shown herein, or they may be arranged in a single transverse or longitudinal line or in several lines either parallel or otherwise, either in the same or different planes. Also the actuators in the machine herein shown may be arranged in four groups of three actuators, whereupon the number of operating members would be four instead of three. Furthermore, since a number of actuators equal to the number of digits in one of the limiting factors of the machine is operated through a like extent, as will appear later, it is obvious that the actuators may be combined so that the number thereof may be equal to the number of digits in one of the limiting factors of the machine, which, in the machine herein shown, may be three or four, as desired.

Each actuator is provided with a series of progressively stepped teeth $B^1$ representing in length the digits 1 to 9, wherein zero is represented by a space off the actuator, as shown best in Fig. 14. The teeth are arranged only partly around the drum in order to provide a blank space $B^4$ between the beginning and end of the series wherein the transfer is made at a time when the registering devices are not being directly actuated, as will be noted later.

The series of teeth may be arranged in various other ways. For instance, any number of such series may be arranged on each actuator, like the multiplier drum disclosed in my co-pending application Serial No. 608,622, filed February 14, 1911; or the teeth forming a series may be distributed on several actuators in any arrangement desired, so that the number of actuators may be variously modified. Furthermore, the teeth may be fixed or projectable and retractable on any suitable support in any regular or irregular order either axially of the actuators or at any angle thereto. Also each actuator may comprise a plurality of relatively movable supports bearing teeth, wherein any one support may be projected into the path of the registering device, or the actuator may directly actuate the result indicators without the interposition of registering devices. The only essential condition of the entire combination is that the result indicators be actuated in proper denominational relation in accordance with the products of the separate digits of the factors to be multiplied together.

The actuators B are mounted on shafts. B², and each actuator is adapted to be rotated simultaneously with the others of the same group, and through the same extent, by means of the engaging gears B³ fastened to the actuators. Adjacent actuators of the same group are thereby rotated in opposite directions, while those of the different groups in the same line are rotated in the same direction. One actuator of each group is secured to its shaft so that when the shaft is turned by the corresponding operating handle, as will be noted later, the entire group of actuators is turned. The actuators marked $b$, $g$, and $m$ in Fig. 3 are each fastened to their respective shafts B².

The registering mechanism comprises the handles C, the carriages C¹, the registering devices C², and the transmitting connections C³. The multiplicand digits may be set up either collectively, in groups, or successively in any order desired, by moving the handles C along the slots A² in the cover until the proper digits of the multiplicand indicators C⁴ are exposed to view through the apertures A³ in proper sequence to form the multiplicand factor. The scalloped edge C⁵ of each carriage is engaged by finger spring C⁶ to force the exact setting of the corresponding registering devices in all cases. By these means three registering devices mounted in each carriage are simultaneously moved through like extents axially of the three respective actuators in the three groups, so that during one rotation of those actuators each of the registering devices is turned through a number of teeth equal to the digit set up. In this way the digital actuation, corresponding to the passage of one series of teeth on the actuator, of a number of registering devices equal to the number of digits in the limiting multiplier of the machine is predetermined in accordance with each digit of the multiplicand to be multiplied, whereby the total number of registering devices equals the product of the number of digits in the limiting factors of the machine. Each registering device C² is slidably mounted on a square shaft C³, which is properly journaled in bearings and forms the transmitting connection to a result indicator. The registering devices in the same line have the same denomination and are mounted on the same shaft C³, any one being adapted to turn the shaft in accordance with its actuation by the respective actuator.

Each registering device carries a scalloped disk C⁷ with ten cut out portions adapted to engage the co-acting projections B³, which extend from the end teeth of each line on the actuator to the blank space B⁴, thereby stopping the rotation of the registering device in either direction as soon as its digital actuation is completed. In this way, overthrow of the registering devices is prevented without interfering with their direct actuation by the actuators and without interfering with the transfer operation of the transfer mechanism, as will be noted later. If the multiplicand factor contains a number of digits less than the capacity of the machine, then one or more of the carriages C¹ will not be moved, so that the registering devices mounted therein will not be subsequently actuated. Hence the machine is adapted to multiply any multiplicand having a number of digits equal to or less than the number of digits in the limiting multiplicand of the machine.

Various other methods of predetermining the subsequent digital actuation of the registering devices may be used. For example, the actuators may be moved, or teeth on the actuators may be projected or retracted, or single series of teeth may be moved into the path of the registering devices, as is well known in the art. Furthermore, the number of registering devices in each carriage and the total number thereof may be variously modified, but where the registering devices are permanently connected to result indicators and where all those on which the product of the same two digits are wholly or in part registered are considered to form a "registering device" then the number moved to set up each multiplicand digit equals the number of digits in the limiting multiplier, and the total number equals the product of the number of digits in the two limiting factors of the machine. Also where all the registering devices set up for each multiplicand digit are mounted in a single carriage so as to be collectively moved thereby, then the number of carriages equals the number of digits in one of the limiting factors and the number of registering devices in each carriage equals the number of digits in the other limiting factor of the machine.

The number of rotations through which each group of actuators is turned is controlled by an operating member comprising an operating handle D, a multiplier indicator D¹, a train of multiplying gearing connecting the shaft D² with the corresponding shaft B² to which one actuator mounted thereon is securely fastened, and the engaging gears B³ fastened to the actuators, so that all the actuators of the same group are rotated simultaneously by one operating handle and through like extents. A serrated wheel $D^3$ is tightly mounted on each shaft $D^2$ and a spring $D^4$ engages the serrated wheel so as to force the exact setting of the operating handle. Each train of multiplying gearing comprises an intermittent gear $D^5$ and the gear $D^6$ engaging therewith, together with the engaging gears $D^{10}$ and $B^{11}$, the combination forming an ordinary ten to one train of multiplying gearing, so that one complete rotation of the operating handle produces ten complete rotations of the corresponding shaft $B^2$ and of the corresponding group of actuators; or one-tenth of a rotation of the operating handle, corresponding to the angle between consecutive digits on the multiplier indicators $D^1$, which appear through the apertures $A^6$, produces one complete rotation of the corresponding group of actuators. As a result of the blank space in the intermittent gears, any back lash in the multiplying train is compensated for. Each multiplier indicator $D^1$ is fastened on a shaft $D^2$ so as to be driven thereby, and comprises a line of digits consecutively arranged so as to progressively increase as the operating handle is turned in a clockwise direction by the operator. The operating handles D are turned in a clockwise direction for all the arithmetical processes. A cam disk $D^7$ securely mounted on shaft $D^8$ is adapted to lock the corresponding group of actuators, by means of the co-acting cam $D^9$ carried on the shaft $B^2$, during the period of operation of the operating member that the intermittent gear $D^5$ comes out of an engagement with the gear $D^6$, and when the registering devices $C^2$ come into the blank spaces of respective actuators. In this way, the actuator is stopped after each complete rotation so that overthrow of the actuators is prevented.

From the above it is obvious that each registering device will be turned through a number of teeth equal to the multiplicand digit set up thereby during each rotation of the respective actuator; and by rotating each group of actuators in accordance with a multiplier digit, means are provided for effecting actuation of the registering devices in accordance with the products of the separate digits of the factors to be multiplied together. The group of actuators nearest the result indicators is controlled by the operating handle on the extreme right, and a number of teeth through which each registering device of that group is turned is given by the product of the separate multiplicand digits set up thereby, and the multiplier digits of lowest denomination. Each registering device of the other group is similarly actuated through a number of teeth determined by the separate multiplicand digits and one of the other multiplier digits, so that the multiplicand factor set up is multiplied as the digits of the multiplier are being set up, and the complete product of the factors exposed to view is in sight at all times on the result indicators. If the multiplier contains a number of digits less than the number of digits in the limiting multiplier of the machine, then one or more of the operating handles is not operated, and the corresponding actuators do not actuate the registering devices which may be set up thereon. In this way, any multiplier having a number of digits equal to or less than the number of digits in the limiting multiplier of the machine may be multiplied.

The operating members herein disclosed may obviously be modified in many particulars. For example, the actuators may be turned through one or through any other number of rotations by one complete rotation of the operating handle, whereby the train of multiplying gears could be eliminated or variously modified. The actuators could be operated successively, or in various groups, or all at the same time, and they could be given the same direction of rotation. Furthermore, actuation of the registering devices could be effected by operating them and maintaining the actuators fixed in position during the operation, or both could be moved to bring about this result. Also the registering devices and the transmitting connections could be eliminated entirely or in part by actuating all or some of the result indicators directly from all or some of the actuators. The only essential condition is that the result indicators should be actuated in proper denominational relation in accordance with the products of the separate digits of two factors to be multiplied together.

The adding mechanism comprises the result indicators permanently connected to the registering devices in proper denominational relation by the transmitting connections, and the transfer mechanism for transferring units to the result indicators of the next higher denominations. The minimum number of result indicators required is equal to or is one less than the sum of the number of digits in the limiting factors of the machine, but in order to totalize successive products and to increase the capacity of the machine for the other calculations, an additional result indicator is provided, giving a total of eight of them. The result indicators of two highest denominations are not connected to registering devices, but are operated by the transfer mechanism. Each result indicator E is fastened on a shaft $C^3$ so as to be rotated thereby, and is provided with two lines of digits consecutively arranged in reverse directions to each other and in reverse directions to the corresponding lines of digits of adjacent result indicators, whereby all the digits of the line $E^1$ appearing through the apertures $A^4$ progressively increase during multiplication and addition, while the other line $E^2$ of digits progressively decrease during division and subtraction. The two lines of digits on the result indicators are so arranged that the sum of any two opposite digits equals nine. The slide $E^3$ has two offset lines of apertures $E^4$ and $E^5$, whereby with the pointer $E^6$ attached to the slide $E^3$ pointing to M and A, designating multiplication and addition, as shown in Fig. 1, the digits of line $E^1$ on the result indicators are exposed to view through the apertures $E^4$ and $A^4$ while the apertures $E^5$ are covered by the cover $A^1$ of the machine; and whereby with the pointer $E^6$ pointing to D and S, designating division and subtraction, the digits of line $E^2$ on the result indicators are exposed to view through apertures $E^5$ and $A^4$, while the apertures $E^4$ of the slide are then covered by the cover $A^1$. The result indicator of highest denomination at the extreme left, is mounted on a shaft $C^3$ together with a cam $E^7$ adapted to move one end $E^8$ of a pivoted elbow lever when the result indicator is passing from 9 to 0 in multiplication or addition and from 0 to 9 in division or subtraction and thereby indicate by a tap of the hammer $E^9$ on the bell $E^{10}$ when a unit has been carried to the indicator in division and when the limit of indication of the machine has been passed in totalizing successive products in multiplication or successive sums in additions. (See Fig. 2). Any other suitable form of result indicators and any other suitable method of operatively connecting them to the registering devices may be used.

The transfer mechanism herein shown is adapted to transfer units to result indicators of next higher denominations after each digital actuation of the registering devices; to be set for transferring a unit while any result indicator is passing from 9 to 0 in multiplication or addition and from 0 to 9 in division or subtraction; to provide for successive transfers from the lowest to the highest denomination, when the result indicators to which units are to be transferred are at 9 in multiplication or addition and at 0 in division or subtraction, whereby all the transfers may be made at the same time; and finally to reset all the transfer mechanism for subsequent operations after the transfer is completed. The construction by which the transfer mechanism is adapted for successive transfers during a single movement of the transfer bar, is especially desirable in view of the rapidity with which the entire operation should be performed. The transfer mechanism is mounted on a central bar F, which is stationary, and on two outside bars $F^1$ and $F^2$ which move in opposite directions as a result of the pivotal connections at $F^3$. A cam $F^4$ with a nose projection $F^5$ is securely mounted on each shaft $C^3$, except the one of highest denomination, so as to engage a cam projection $F^6$ on the respective lever $F^7$, pivoted on the stationary bar at $F^9$, when the corresponding result indicator is passing from 9 to 0 in multiplication or addition in the direction of the arrows in Fig. 5 and from 0 to 9 in the opposite direction for division or subtraction. In this way, the cam projection $F^6$ is pressed down and the other end $F^{10}$ is raised and thereby lifts the bent portion $F^{11}$ of the lever $F^{12}$, pivoted at $F^{13}$ on the outside bar $F^2$, so that the teeth $F^{14}$ are elevated into line with the ten-tooth gear $F^{15}$ mounted in line therewith on the shaft $C^3$ of next higher denomination. (See Fig. 12.) This lever $F^{12}$ is then held in the actuating position by the lower part of spring $F^{16}$. If the indicator to which a unit is to be transferred should then stop at or pass 9 in multiplication or addition and 0 in division or subtraction, the projection $F^{17}$ of lever $F^{18}$, which is pivoted at $F^{19}$ on the same side bar, would be forced up by the spring $F^{20}$ into the cut out portion $F^{21}$ of the disk $F^{22}$, which is also securely mounted on the shaft $C^3$ except in the case of highest denomination. However, in its upward movement, the end $F^{23}$ would lift the bent portion $F^{11}$ of the lever $F^{12}$ of next higher denomination, which is pivoted on the other side bar $F^1$ so as to move in the opposite direction upon the subsequent transfer operation and thereby actuate the corresponding gear $F^{15}$ in the opposite direction, corresponding to the same progression of digits on that result indicator as the progression effected on the others. If that result indicator should pass 9 in multiplication or 0 in division, then the projection $F^{17}$ would ride out of the cut out portion $F^{21}$ but the lever $F^{12}$ would remain in its actuating position and would not be disturbed by the subsequent movement of lever $F^{18}$. However, if this result indicator should not stop at or pass 9 in multiplication or 0 in division, the lever $F^{12}$ of next higher denomination would not be set for successive transfers, and if the lever $F^{12}$ of next lower denomination was not set to transfer a unit then the nose $F^{17}$ would be prevented from rising when the corresponding cut out portion of disk $F^{22}$ stopped at or passed the position corresponding to 9 in multiplication or 0 in division by reason of the fact that projection $F^{24}$ would be locked by the pivoted member $F^{25}$ (Fig. 8) until the corresponding lever $F^{12}$ was elevated. Since the transfer mechanism must be set for successive transfers when the result indicator to which a unit is to be transferred is at 9 in multiplication or addition and at 0 in division or subtraction, 9 and 0 of the lines of digits on result indicators are placed opposite one another, whereby the cams $F^4$ and $F^{22}$ serve for all the arithmetical processes. The actual transfer of the units to the result indicators of next higher denominations is performed when the registering devices $C^2$ are in the blank spaces $B^4$ of the actuators. The shaft $B^2$ is fastened to actuator $k$ and rotates with it, so that the projection $F^{26}$ of the cam $F^{27}$, which is positively driven by means of the engaging gears $F^{28}$ from the shaft $B^2$, is adapted to engage the finger $F^{29}$ carried by the transfer bar $F^1$, thereby moving the transfer bar $F^1$ to the right and the other transfer bar $F^2$ to the left against the action of the springs $F^{30}$. In this way, the transfers are made as soon as the registering devices come into the blank spaces of the actuators and just before each rotation is completed. In a similar way the actuator $F$ of the middle group is fastened on the corresponding shaft $B^2$ and actuator $a$ is fastened to its shaft $B^2$, while the corresponding projections $F^{26}$ and fingers $F^{29}$ engage when the registering devices are in the blank spaces of the respective actuators to again move the transfer bar $F^1$ to the right and $F^2$ to the left just before the end of each rotation of the corresponding group of actuators, so that the transfer is made when the registering devices are in their blank spaces and when any operating handle is turned. Near the end of the movement of the transfer bars and just after all the units have been transferred, the levers $F^{12}$ which were set for actuation are cleared as a result of the engagement of projections $F^{31}$ and the fixed pins $F^{32}$, or as a result of the engagement of the projection $F^{33}$ with the shafts $C^3$. The springs $F^{34}$ then force the pivoted members $F^{25}$ into normal position. By this time the projection $F^{26}$ and the engaging finger $F^{29}$ come out of engagement and the springs $F^{30}$ are allowed to pull the transfer bars $F^1$ and $F^2$ back into normal position ready for a subsequent transfer operation, and cause the pivoted member $F^{25}$ to force the levers $F^{18}$ into their depressed position. The spring $F^{35}$ forces the projections $F^6$ of levers $F^7$ into their normally raised position as soon as the nose projections $F^5$ have passed out of engagement therewith. It will be observed that the movements of the parts are very small so that the entire transfer operation may be extremely rapid. Whenever desired, such as after setting up a dividend in division or a minuend in subtraction, the bars $F^{37}$ with projection $F^{38}$ may be pulled out by the handle $F^{39}$ to clear all the transfer mechanism which may have been actuated during the setting up operation. The springs $F^{40}$ then pull the levers $F^{37}$ back into normal position after the handle $F^{39}$ is released. The result indicators are set up in division and subtraction by means of buttons $E^7$ fastened in the shafts $C^3$.

Any other suitable form of transfer mechanism may be used. For example, the units may be transferred by mechanism which has no delayed action; or the feature of successive transfer may be omitted; or transfer operations may await more than one digital actuation of the registering devices; or means not associated with the operating mechanism may be used to move the transfer bars.

The clearing mechanism will now be described. The multiplier indicators $D^1$ and the result indicators $E$ may be cleared at the same time, or the multiplier indicators may be cleared and the result indicators left in the position to which they were actuated, as is desirable in totalizing a series of products, or in addition, or in successive subtractions. For simultaneously clearing both sets of indicators, the button $H$ is set to the position shown in Fig. 1, whereby the clutch members $H^{11}$ and $H^{14}$ are in engagement. The handle $H^1$ is then pulled to the left in Fig. 1, thereby moving the clearing member $H^3$ against the action of the spring $H^4$. During the first part of this movement, the beveled surfaces $H^5$ force the clutch members $H^7$ out of engagement with the respective clutch members $H^6$ against the action of the springs $H^8$, so that the multiplier indicators $D^1$ together with the mutilated gears $H^{10}$ and the clutch members $H^6$, which are fastened thereto, are then loose on the shaft $D^2$. The teeth $H^9$ then comes into engagement with the mutilated gears $H^{10}$ and return the multiplier indicators $D^1$ to zero in the well known manner. The clutch member $H^{11}$ is slidably mounted on the shaft $H^{12}$ by means of a feather and groove connection $H^{13}$, while the co-acting engaging clutch member $H^{14}$ is fastened on the shaft $H^{15}$. When the button $H$ is in the position shown in Fig. 1, the clutch members are engaged and the shaft $H^{12}$ is turned at the same time that the multiplier indicators are cleared by reason of the engagement of the gear $H^{15}$ with the rack teeth $H^{16}$. The rack $H^{17}$ is moved thereby to turn the mutilated gears $H^{18}$ on the shaft $C^3$, and all the result indicators $E$ are reset to zero in the well known manner. Upon release of the handle $H$ the clearing member $H^3$ and the rack $H^{17}$ are returned to normal position by the springs $H^4$ and $H^{19}$, whereupon the springs $H^8$ force the clutch members $H^6$ into engagement with the corresponding members $H^7$, and thereby operatively connect the multiplier indicators with their shafts so as to be rotated thereby when the operating handles are again turned. By pulling the lever $H$ to the other end of slot $H^{20}$ in Fig. 1, the clutch members $H^{11}$ and $H^{14}$ are disengaged by the forked member $H^{21}$ engaging the collar $H^{22}$. The multiplier indicators $D^1$ are then cleared alone, while the result indicators E are retained in the position to which they were previously actuated. When desired, the result indicators may be cleared alone by pulling out the handle $H^{23}$ which is fastened to the clearing rack $H^{17}$. The registering devices $C^2$ are kept in the positions to which they were set. Obviously it is unnecessary to reset the actuators.

In performing multiplication or addition, the button $E^6$ is set to indicate M and A as shown in Fig. 1. In this position the apertures $E^4$ in the slide $E^3$ register with the apertures $A^4$ in the cover, so that the line $E^1$ of digits on the result indicators are exposed to view, while the apertures $E^5$ in the slide over the line $E^2$ of digits are covered by the cover $A^1$. When the button $E^6$ is set to D and S, the apertures $E^5$ in the slide $E^3$ register with the apertures $A^4$ in the cover so that the line $E^2$ of digits is exposed to view, while the apertures $E^4$ in the slide over the line $E^1$ of digits are closed by the cover of the machine. In this way, the proper line of digits on the result indicators are exposed to view for all of the arithmetical processes.

The method of operating the machine for the different arithmetical processes will now be described. In multiplication, the multiplicand digits are first set up by means of buttons C, and then the operating handles D are turned until the multiplier indicators $D^1$ show the proper digits. The digits in either of the two factors may obviously be set up in any order, the only essential condition being that the digits must appear in proper sequence to form the respective factors. However, it is preferable to set the digits of lowest denomination on the members of lowest denomination, so that the product digit of lowest denomination appears on the result indicator at the extreme right. In the example shown in Fig. 15, the multiplicand buttons C are set so that the digits 3, 7, 6 and 9 are exposed to view, as shown in Fig. 1, whereupon each factor is set up three times, as indicated in Fig. 15. The multiplier handles $D^1$ are then turned successively to set up the digits 8, 7 and 6, whereupon the product 3, 301, 644 will appear through the apertures $A^4$ as soon as the multiplier is completely set up, as shown in Fig. 1. In setting up the multiplier digit 8 the digits of the multiplicand factor 3769 are simultaneously multiplied on actuators $a$, $b$, $c$ and $d$, and the separate products 24, 56, 48 and 72 are added in proper denominational relation on the adding mechanism. The digits of the multiplicand factor are again simultaneously multiplied by the second multiplier digit 7 on the actuators $e$, $f$, $g$ and $h$, whereupon the separate products are added to the others in proper denominational relation. The digits of the multiplicand factor are again simultaneously multiplied by the multiplier digit 6 on the actuators $i$, $j$, $k$, and $m$, and the partial products are added to the others in proper denominational relation as before. If it is desired to totalize successive products, the button H is moved so that the clutch members $H^{11}$ and $H^{14}$ are disengaged. The first problem is then performed and then the clearing lever $H^1$ is operated to clear the multiplier indicators alone. The next problem is then performed and the product of the two factors of that problem are added to the result of the last problem. Other problems within the limit of the machine may be performed in succession, and the result indicators E will show at all times the sum of all the products obtained.

The method of performing addition is as follows: The indicators are cleared, and the multiplicand buttons C are set in accordance with the first number. The proper operating handle is then turned until the digit 1 appears on the multiplier indicator. The number set up by the multiplicand buttons will thereupon be transferred to the result indicators. The next number to be added to the first one, is then set up by the multiplicand buttons and the proper operating handle is again turned one digit, whereupon the sum of the two numbers will appear on the result indicators. Any other numbers within the capacity of the machine may be added in a similar way. It is to be noted that it is not essential to return the multiplier indicators to their zero position after each operation, although they may be so returned if desired by moving the button H to disengage the clutch members $H^{11}$ and $H^{14}$. It is also to be noted that the numbers to be added must be set up on the proper multiplicand buttons and that the proper operating handle must be turned, so that the numbers will be transferred to the result indicators in their proper denominational relation.

The method of performing division is as follows: The machine is cleared and the slide $E^3$ is moved to indicate division, whereupon the digits 9 on the line $E^2$ of the result indicators will be exposed to view. The result indicators are set to represent the quotient by means of the buttons $E^7$, it being preferable to set up the digit of highest denomination on the result indicator of second highest denomination, so that when any quotient digit is carried too far the indicator of highest denomination will pass from zero to nine and the bell will ring to indicate the error to the operator. In setting up the dividend, it may happen that the transfer mechanism may be set to an actuating position. It then becomes necessary to clear the transfer mechanism before the machine is operated by pulling out the handle F³⁹. The divisor is then set up by means of the multiplicand buttons C in such manner that the digit of the highest denomination is set up by the button of highest denomination when the digit of a quotient of highest denomination is set up on result indicator of second highest denomination. The operating handle D of highest denomination is then turned in a clockwise direction until the divisor becomes greater than the same number of significant figures at the left of the remainder. The remaining operating handles are then operated in the same manner until the entire quotient is obtained. If the dividend is not exactly divided, the remainder will be shown on the result indicators, while the divisor is still shown on the multiplicand indicators and the quotient on the multiplier indicators. If desired, the remainder may be set up again and more digits of the quotient ascertained in the same way. As an example, Fig. 16 shows the result in steps by dividing 3,301,644 by 8769, giving a quotient of 876 and no remainder. It will be observed in this example that when the first quotient digit 8 is obtained the divisor has just become greater than the first four significant digits of the first remainder. The next operating handle is then turned to 7, when the divisor just becomes greater than the first four digits of the second remainder. And when the operating handle of the lowest denomination is turned to the digit 6, the remainder becomes 0, showing that the quotient is exactly 876.

The operation of subtraction is performed as follows: The button H is moved to indicate subtraction, whereupon the digits 9 on the line E² of the result indicators are exposed to view. The minuend is then set up on the result indicators by means of the buttons E⁷, and the handle F³⁹ is pulled out to clear the transfer mechanism. The subtrahend is then set up by means of the buttons C in such relation that the two numbers are in proper denominational relation. The proper operating handle is then turned in a clockwise direction until the digit 1 appears on the corresponding multiplier indicator. The difference of the two numbers will then be shown on result indicators. Other numbers may then be subtracted from the remainder in a similar way.

Having thus described my invention, what I claim is:

1. In a calculating machine for mechanically attaining an indication of the product of any two factors of one or more digits up to the number provided for, a nonindenting adding mechanism comprising a plurality of result indicators of successive denominations, means for selecting a series of result indicators in accordance with the denomination of each digit of the multiplier factor, and mechanism for advancing each series of result indicators in accordance with the product of the multiplicand factor and the multiplier digit corresponding to that series; substantially as described.

2. In a calculating machine for mechanically attaining an indication of the product of any two factors of one or more digits up to the number provided for, nonindenting adding mechanism comprising a plurality of result indicators of successive denominations, means for selecting a series of result indicators in accordance with the denomination of each digit of the multiplier factor, and mechanism for advancing at will any series of result indicators in accordance with the result of the multiplicand factor and the multiplier digit corresponding to that series; substantially as described.

3. In a calculating machine for mechanically attaining an indication of the product of any two factors of one or more digits up to the number provided for, a nonindenting adding mechanism comprising a plurality of result indicators of successive denominations, actuating means, a plurality of registering devices adapted to be actuated by the actuating means, setting means for relatively positioning the actuating means and registering devices in accordance with the digits of the multiplicand factor, means for operatively connecting the registering devices with a series of result indicators in accordance with the denomination of each digit of the multiplier factor, and driving mechanism for actuating the registering devices to advance each series of result indicators in accordance with the product of the multiplicand factor and the multiplier digit corresponding to that series; substantially as described.

4. In a calculating machine for mechanically attaining an indication of the product of any two factors of one or more digits up to the number provided for, a nonindenting adding mechanism comprising a plurality of result indicators of successive denominations, means for selecting in accordance with the denomination of each digit of the multiplier factor a series of result indicators equal in number to the number of digits in the multiplicand factor, and mechanism for advancing each product indicator of each series in accordance with the result of one multiplicand digit and the multiplier digit corresponding to that series; substantially as described.

5. In a calculating machine for mechanically attaining an indication of the product of any two factors of one or more digits up to the number provided for, a nonindenting adding mechanism comprising a plurality of result indicators of successive denominations, a plurality of non-indenting registering devices, means for operatively connecting the registering devices and result indicators, means for selecting a series of result indicators in accordance with the denomination of each digit of the multiplier factor, and mechanism for actuating the registering devices to advance the product indicators of each series in accordance with the product of the multiplicand factor and the multiplier digit corresponding to that series; substantially as described.

6. In a calculating machine, an adding mechanism having indicators of successive denominations, and a multiplying mechanism having registering devices permanently connected to the indicators in indented relation thereto.

7. In a calculating machine, an adding mechanism having indicators of successive denominations, actuators arranged in fixed indented relation to the indicators, and registering devices actuated by the actuators and operatively connected to the indicators.

8. In a calculating machine, an adding mechanism having indicators of successive denominations, a plurality of registering devices operatively connected to the indicators in fixed indented relation thereto, actuators for actuating the registering devices, and means for operating the actuators.

9. In a calculating machine, an adding mechanism having indicators of successive denominations, and a multiplying mechanism permanently connected to the indicators and adapted to register the partial results in proper denominational relation to indicate thereon the product of any two factors of two or more digits up to the number provided for.

10. A calculating machine comprising an adding mechanism, and a multiplying mechanism permanently connected in proper denominational relation to the adding mechanism, said multiplying mechanism having means for registering the products of the separate digits of any two factors within the capacity of the machine, and means for successively operating those parts of the multiplying mechanism which register on the same part of the adding mechanism; substantially as described.

11. A calculating machine comprising an adding mechanism, and a multiplying mechanism permanently connected in proper denominational relation to the adding mechanism, said multiplying mechanism having means for setting up each digit of one factor to be multiplied as many times as there are digits in the limiting multiplier of the machine, and means for multiplying each of the digits set up by each digit of the other factor to be multiplied; substantially as described.

12. A calculating machine comprising actuators equal in number to the product of the number of digits in the limiting factors of the machine, registering devices adapted to be actuated by actuators, result indicators having transfer mechanism, transmitting connections from registering devices to result indicators, and means for effecting actuation of the registering devices in accordance with the products of the separate digits of the factors to be multiplied together.

13. A calculating machine comprising actuators arranged in a number of rows equal to the number of digits in one of the limiting factors of the machine, wherein each row comprises a number of actuators equal to the number of digits in the other limiting factor of the machine; registering devices adapted to be actuated by actuators; result indicators having transfer mechanism; transmitting connections from registering devices to result indicators; and means for effecting actuation of the registering devices in accordance with the products of the separate digits of the factors to be multiplied together.

14. A calculating machine comprising actuators arranged in a number of groups equal to the number of digits in one of the limiting factors of the machine, wherein each group contains a number of actuators equal to the number of digits in the other limiting factor of the machine; a registering device for each actuator; means for predetermining the subsequent digital actuation of a registering device in each group in accordance with one digit of a factor to be multiplied; and operating members for effecting actuation of each group of registering devices in accordance with one digit of the other factor to be multiplied.

15. A calculating machine comprising a plurality of actuators, registering devices adapted to be actuated thereby, result indicators having transfer mechanism, transmitting connections from registering devices to result indicators, means for predetermining the subsequent digital actuation of the registering devices in accordance with the digits of one factor to be multiplied, and operating members for successively operating those actuators which effect actuation of the same result indicator.

16. A calculating machine comprising a plurality of actuators; registering devices adapted to be set up, for each digit of one factor to be multiplied, a number of times equal to the number of digits in the limiting multiplier; result indicators having transfer mechanism; transmitting connections from registering devices to result indicators; and a number of operating members equal to the number of digits in the limiting multiplier; each operating member being adapted to operate, in accordance with a digit of the other factor to be multiplied, a number of actuators equal to the number of digits in the limiting multiplicand.

17. A calculating machine comprising a plurality of actuators, registering devices adapted to be actuated thereby, result indicators having transfer mechanism, transmitting connections permanently connecting registering devices and result indicators, and means for effecting actuation of the registering devices in accordance with the products of the separate digits of the factors to be multiplied together.

18. A calculating machine comprising a plurality of actuators, a number of registering devices adapted to be actuated thereby equal to the product of the number of the digits in the limiting factors of the machine, result indicators having transfer mechanism, transmitting connections from registering devices to result indicators, and means for effecting actuation of the registering devices in accordance with the products of the separate digits of the factors to be multiplied together.

19. A calculating machine comprising a plurality of actuators; a number of registering devices adapted to be actuated thereby equal to the product of the number of digits in the limiting factors of the machine; a number of result indicators equal to one less than the sum of the digits in the limiting factors of the machine; transmitting connections from registering devices to result indicators, whereby several registering devices may be connected to the same result indicator; and means for effecting actuation of the registering devices in accordance with the products of the separate digits of the factors to be multiplied together.

20. A calculating machine comprising a plurality of actuators; registering devices adapted to be actuated thereby; result indicators having transfer mechanism; transmitting connections from registering devices to result indicators; means for predetermining the subsequent digital actuation of the registering devices in accordance with the digits of one factor to be multiplied; operating members for operating the actuators in accordance with the digits of the other factor to be multiplied; and multiplier indicators operatively connected with the operating members; one set of said indicators having two series of reversely arranged digits, wherein one of said series is adapted for multiplication and the other of said series is adapted for division.

21. In a calculating machine, a plurality of actuators arranged in rows and lines, registering devices adapted to be actuated by actuators, result indicators having transfer mechanism, transmitting connections from registering devices to result indicators, means for predetermining the subsequent digital actuation of the registering devices in accordance with the digits of one factor to be multiplied, and operating members adapted to operate adjacent actuators in each row in opposite directions in accordance with one digit of the other factor to be multiplied in such manner that the actuators of the same line are operated in the same direction.

22. In a calculating machine, a plurality of actuators; registering devices adapted to be actuated thereby; result indicators; transmitting connections from registering devices to result indicators; means for effecting actuation of the registering devices in accordance with the products of the separate digits of the factors to be multiplied together; and transfer mechanism for the result indicators adapted to transfer units to higher denominations, and to be set for successive transfers before a unit is transferred.

23. A calculating machine comprising actuators bearing stepped teeth, and being equal in number to the product of the number of digits in the limiting multiplicand and multiplier; a registering device for each actuator adapted to be actuated by the teeth thereon; carriages for moving into predetermined line, in accordance with one digit of a factor to be multiplied, a number of registering devices equal to the number of digits in said multiplier; result indicators having transfer mechanism; transmitting connections permanently connecting registering devices and result indicators; and operating members for operating a number of actuators at a time, in accordance with one digit of the other factor to be multiplied, equal to the number of digits in said multiplicand.

24. In a calculating machine, an adding mechanism, and a number of actuators for effecting actuation of said mechanism equal to the product of the number of digits in the limiting factors of the machine.

25. In a calculating machine, an adding mechanism, and actuators for effecting actuation of the adding mechanism, said actuators being arranged in a number of rows equal to the number of digits in one of the limiting factors of the machine.

26. In a calculating machine, an adding mechanism, and actuators for effecting actuation of the adding mechanism, said actuators being arranged in a number of rows equal to the number of digits in one of the limiting factors of the machine wherein each row contains a number of actuators equal to the number of digits in the other limiting factor of the machine.

27. In a calculating machine, an adding mechanism, and actuators for effecting actuation of the adding mechanism in proper denominational relation, said actuators being arranged in a number of indented rows equal to the number of digits in one of the limiting factors of the machine.

28. In a calculating machine, an actuator having engaging points arranged in lines containing different numbers thereof and also having arresting means, a registering device shiftable to any of said lines and adapted to engage said engaging points to be actuated thereby, and means carried by the registering device and adapted to coöperate with said arresting means to prevent overthrow of the registering device just after said actuation.

29. In a calculating machine, a reversibly-rotatable actuator having engaging points arranged in lines containing different numbers thereof and also having arresting means, a registering device shiftable to any of said lines and adapted to engage said engaging points to be actuated thereby in either direction, and means carried by the registering device and adapted to coöperate with said arresting means to prevent overthrow of the registering device just after said actuation in either direction of rotation.

30. In a calculating machine, an adding mechanism, an actuator having engaging points arranged in lines containing different numbers thereof and also having arresting means, a rotatable registering device connected to the adding mechanism and shiftable to any of said lines to engage said engaging points, and means carried by the registering device and adapted to coöperate with said arresting means to prevent the overthrow of the registering device just after disengagement with the engaging points, the arrangement being such that the registering device is free to rotate during the transfer operation of the adding mechanism.

31. In a calculating machine, an actuator bearing different numbers of circumferentially disposed teeth at different lines along its axis; a registering device adapted to be actuated by any line of said teeth; and co-acting means carried by the actuater and the registering device for stopping the rotation of the registering device when out of engagement with said teeth; said means comprising a scalloped member carried by the registering device, and circumferentially arranged projections on the actuator extending from the end teeth of each line and adapted to engage the scalloped portions.

32. In a calculating machine, an actuator bearing different numbers of circumferentially disposed teeth at different lines along its axis, a registering device adapted to be actuated by any line of said teeth, co-acting means carried by the actuator and the registering device for stopping the rotation of the registering device when out of engagement with said teeth, and an axially disposed blank space wherein the registering device may be turned.

33. In a calculating machine, an adding mechanism, a rotatable actuator for effecting actuation of the adding mechanism, an operating member for rotating the actuator, and co-acting means between the operating member and the actuator for preventing the rotation of the actuator during a limited movement of the operating member.

34. In a calculating machine, an adding mechanism, a rotatable actuator for effecting actuation of the adding mechanism, an operating member for rotating the actuator through a limited angle, and co-acting means between the operating member and the actuator for stopping the rotation of the actuator after it has been rotated through that angle.

35. In a calculating machine, an adding mechanism, a rotatable actuator for effecting actuation of the adding mechanism, an operating member for rotating the actuator through a limited angle, and co-acting means between the operating member and the actuator for stopping the movement of the actuator after it has been turned through that angle; said means comprising a continuous gear on the actuator, an intermittent gear on the operating member, and locking cams between the actuator and the operating member adapted to engage when said gears are out of engagement.

36. In a calculating machine, an adding mechanism having indicators of successive denominations, a plurality of actuators, and a plurality of registering devices actuated by the actuators and permanently connected to the indicators in such manner as to register the partial results in proper denominational relation to indicate thereon the product of any two factors of two or more digits up to the number provided for.

37. In a calculating machine, an adding mechanism, and a number of registering devices connected thereto equal to the product of the number of digits in the limiting factors of the machine.

38. In a calculating machine, an adding mechanism, and a number of registering devices permanently connected thereto in proper denominational relation, said number being equal to the product of the number of digits in the limiting factors of the machine.

39. In a calculating machine, an adding mechanism, a number of registering devices connected thereto equal to the product of the number of digits in the limiting factors of the machine, and a plurality of actuators adapted to actuate the registering devices.

40. In a calculating machine, an adding mechanism, a number of actuators equal to the product of the number of digits in the limiting factors of the machine, and a registering device for each actuator permanently connected to the adding mechanism in proper denominational relation.

41. In a calculating machine, a number of registering devices equal to the product of the number of digits in the limiting factors of the machine; a plurality of actuators adapted to actuate the registering devices; and means for predetermining, for each digit of a number to be multiplied, the subsequent digital actuation of a number of registering devices equal to the number of digits in one of said factors.

42. In a calculating machine, a number of actuators equal to the product of the number of digits in the limiting factors of the machine; a registering device for each actuator adapted to be actuated thereby; and means for predetermining, for each digit of a number to be multiplied, the subsequent digital actuation of a number of registering devices equal to the number of digits in one of said factors.

43. In a calculating machine, a number of actuators equal to the number of digits in one of the limiting factors of the machine, a plurality of registering devices adapted to be actuated thereby, and means for predetermining the digital actuation of each of said registering devices in accordance with a single one of the digits of a number to be multiplied.

44. In a calculating machine, a number of actuators equal to the number of digits in one of the limiting factors of the machine, a registering device for each actuator adapted to be actuated thereby, and means for predetermining the digital actuation of each of said registering devices in accordance with a single one of the digits of a number to be multiplied.

45. In a calculating machine, a plurality of actuators, a number of carriages equal to the number of digits in one of the limiting factors of the machine, and a plurality of registering devices in each carriage adapted to be collectively moved into predetermined lines with said actuators in accordance with a digit to be set up.

46. In a calculating machine, a plurality of actuators, a number of carriages equal to the number of digits in one of the limiting factors of the machine, a number of registering devices in each carriage equal to the number of digits in the other limiting factor of the machine, and means for moving carriages into predetermined lines with actuators in accordance with the digits of a number to be set up.

47. In a calculating machine, a number of actuators equal to the number of digits in one of the limiting factors of the machine, a carriage, a registering device in said carriage for each of said actuators, and means for moving said carriage in accordance with a digit to be set up.

48. In a calculating machine, a number of actuators equal to the product of the number of digits in the limiting multiplicand and multiplier; a number of carriages equal to the number of digits in said multiplicand; registering devices in each carriage adapted to be actuated by respective actuators, and being equal in number to the number of digits in said multiplier; and means for moving each carriage in accordance with a digit of a number to be set up.

49. In a calculating machine, an adding mechanism, a number of registering devices connected thereto equal to the product of a number of digits in the limiting factors of the machine, and means for effecting actuation of the registering devices in accordance with the products of the separate digits of the factors to be multiplied together.

50. In a calculating machine, an adding mechanism, a plurality of registering devices permanently connected thereto in proper denominational relation, and means for effecting actuation of the registering devices in accordance with the products of the separate digits of the factors to be multiplied together.

51. In a calculating machine, registering devices arranged in a number of groups equal to the number of digits in one of the limiting factors of the machine, wherein each group contains a number of registering devices equal to the number of digits in the other limiting factors of the machine; and means for effecting actuation of each of said groups of registering devices.

52. In a calculating machine, an adding mechanism; registering devices permanently connected thereto in proper denominational relation, and arranged in a number of groups equal to the number of digits in one of the limiting factors of the machine, wherein each group contains a number of registering devices equal to the number of digits in the other limiting factor of the machine; and means for effecting actuation of each of said groups in accordance with the products of the separate digits of one factor to be multiplied and one digit of the other factor to be multiplied.

53. In a calculating machine, a plurality of actuators, a number of registering devices adapted to be actuated thereby equal to the product of the number of digits in the limiting factors of the machine, and a number of operating members equal to the number of digits in one of said factors; each of said members being adapted to effect actuation of a number of registering devices equal to the number of digits in the other of said factors.

54. In a calculating machine, a number of actuators equal to the product of the number of digits in the limiting factors of the machine, registering devices adapted to be actuated thereby, and a number of operating members equal to the number of digits in one of said factors; each member being adapted to operate a number of actuators equal to the number of digits in the other of said factors.

55. In a calculating machine, a number of actuators equal to the number of digits in one of the limiting factors of the machine, a registering device for each actuator adapted to be actuated thereby in accordance with a digit of one factor to be multiplied, and an operating member for each actuator adapted to operate the actuator in accordance with a single one of the digits of the other factor to be multiplied.

56. In a calculating machine, an adding mechanism having a plurality of result indicators, a greater plurality of registering devices operatively connected to the result indicators, and means for effecting successive actuation of those registering devices which are connected to the same result indicator.

57. In a calculating machine, a number of result indicators equal to one less than the sum of the digits in the limiting factors of the machine; a number of registering devices permanently connected to said result indicators, and equal to the product of the number of digits in said factors; and means for effecting successive actuation of those registering devices which are connected to the same result indicator.

58. In a calculating machine, a result indicator, an actuator, a registering device adapted to be actuated by the actuator, and a transmitting connection permanently connecting the registering device with the result indicator.

59. In a calculating machine, a result indicator, an actuator, a registering device adapted to be actuated by the actuator, means for predetermining the digital actuation of the registering device in accordance with a digit to be multiplied, and a transmitting connection permanently connecting the registering device with the result indicator.

60. In a calculating machine, a result indicator, a plurality of actuators, a plurality of registering devices adapted to be actuated by actuators, means for predetermining the digital actuation of the registering devices in accordance with the digits of one factor to be multiplied, and transmitting connections operatively connecting several of the registering devices to the same result indicator.

61. In a calculating machine, a number of actuators equal to the product of the number of digits in the limiting factors of the machine; a plurality of registering devices adapted to be actuated thereby; and a number of operating members equal to the number of digits in one of said factors; each member having means for simultaneously operating through like extents, a number of actuators equal to the number of digits in the other of said factors.

62. In a calculating machine, a plurality of actuators, a registering device for each actuator, an operating member provided with an indicator for indicating the digital movement thereof, and a positive connection between said member and said actuator for rotating each actuator through one rotation for each fractional part of a rotation of the operating member.

63. In a calculating machine, an adding mechanism having indicators of successive denominations, a plurality of linearly arranged actuators, positive connections arranged to rotate adjacent actuators in opposite directions, a registering device for each actuator connected to the adding mechanism, and an operating member positively connected to one of said actuators, whereby adjacent indicators are actuated in opposite directions by the operation of the operating member.

64. In a calculating machine, an operating member, an actuator adapted to be rotated by the operating member, a multiplier indicator operatively connected to the operating member to indicate the number of digital actuations of said actuator, and means for disconnecting the multiplier indicator from the operating member for the purpose of clearing.

65. In a calculating machine, an operating member, an actuator adapted to be rotated by the operating member, a multiplier indicator operatively connected to the operating member to indicate the number of digital actuations of said actuator, and means for first disconnecting the multiplier indicator from the operating member and then clearing it.

66. In a calculating machine, an actuator, a registering device adapted to be actuated thereby, and an operating member for effecting actuation of the registering device; said member comprising a rotatable shaft, an indicator detachably connected to said shaft, whereby the indicator may be turned by said shaft and may be disconnected so as to be turned independently thereof for the purpose of clearing.

67. In a calculating machine, an actuator, a registering device adapted to be actuated thereby, and an operating member for effecting actuation of the registering device; said member comprising a rotatable shaft, an indicator, a clutch member operatively connected to the indicator, and a co-acting clutch member operatively connected to the shaft.

68. In a calculating machine, a plurality of result indicators, a plurality of operating members for effecting actuation of said result indicators, multiplier indicators adapted to be operated by said members, means for clearing the result indicators, means for clearing the multiplier indicators, and a detachable connection between said means whereby all of said indicators may be collectively cleared or whereby said multiplier indicators may be cleared alone.

69. In a calculating machine, a plurality of result indicators, means for actuating said indicators, and transfer mechanism for said indicators adapted to transfer units and also adapted to be set for successive transfers before a unit is transferred.

70. In a calculating machine, a plurality of result indicators, means for actuating said indicators, transfer mechanism for said indicators adapted to transfer units and also adapted to be set for successive transfers before a unit is transferred, and means for transferring all the units simultaneously.

71. In a calculating machine, a plurality of result indicators, means for setting up a number of said indicators, transfer mechanism adapted to be set for transferring units in setting up the number, and means for clearing the transfer mechanism at will.

72. In a calculating machine, a non-indenting adding mechanism comprising indicators of successive denominations, a non-indenting multiplying mechanism coöperative with the adding mechanism, and means for registering the actuation of the multiplying mechanism on the series of indicators that corresponds to the denomination of the multiplier digit.

73. In a calculating machine, a non-indenting adding mechanism having indicators of successive denominations, and a multiplying mechanism having a plurality of indented series of registering devices coöperative with the indicators, the number of said series being equal to the number of multiplier digits provided for.

74. In a calculating machine, a non-indenting adding mechanism having indicators of successive denominations, a multiplying mechanism having a plurality of indented series of registering devices, the number of said series being equal to the number of the multiplier digits provided for, and operative connections permanently connecting all the registering devices of the same denomination to the indicator of that denomination.

75. In a calculating machine for mechanically attaining an indication of the product of any two factors of one or more digits up to the number provided for, a nonindenting adding mechanism comprising a plurality of result indicators of successive denominations, a plurality of non-indenting registering devices, means for operatively connecting the registering devices and result indicators, means for selecting in accordance with the denomination of each digit of the multiplier factor a series of result indicators comprising a number thereof equal to the number of digits in the multiplicand factor, and driving mechanism for actuating the registering devices to advance the individual result indicators of each series in accordance with the product of one multiplicand digit and the multiplier digit corresponding to that series; substantially as described.

76. In a calculating machine for mechanically attaining an indication of the product of any two factors of one or more digits up to the number provided for, a nonindenting adding mechanism comprising a plurality of result indicators of successive denominations, actuating means, a plurality of non-indenting registering devices adapted to be actuated by the actuating means, setting means for relatively positioning the actuating means and registering devices in accordance with the digits of the multiplicand factor, transmitting devices extending to individual result indicators and arranged in connective relation with the actuating means through the registering devices, means for selecting a series of transmitting devices in accordance with the denomination of each digit of the multiplier factor, and driving mechanism for actuating the transmitting devices of each series to advance the respective result indicators in accordance with the result of the multiplicand factor and the multiplier digit corresponding to that series; substantially as described.

77. In a calculating machine for mechanically attaining an indication of the product of any two factors of one or more digits up to the number provided for, a nonindenting adding mechanism comprising a plurality of result indicators of successive denominations, actuating means, a plurality of non-indenting registering devices adapted to be actuated by the actuating means, setting means for relatively positioning the actuating means and registering devices in accordance with the digits of the multiplicand factor, transmitting connections permanently connecting the registering devices and result indicators, means for selecting a series of registering devices in accordance with the denomination of each digit of the multiplier factor, and driving mechanism for actuating each series of registering devices to advance the connected result indicators in accordance with the product of the multiplicand factor and the multiplier digit corresponding to that series; substantially as described.

78. In a calculating machine for mechanically attaining an indication of the product of any two factors of one or more digits up to the number provided for, a nonindenting adding mechanism comprising a plurality of result indicators of successive denominations, actuating means, a plurality of non-indenting registering devices adapted to be actuated by the actuating means, setting means for relatively positioning the actuating means and registering devices in accordance with the digits of the multiplicand factor, transmitting connections permanently connecting the registering devices and result indicators, means for selecting a series of registering devices, comprising a number thereof equal to the number of digits in the multiplicand factor, in accordance with the denomination of each digit of the multiplier factor, and driving mechanism for actuating each registering device of each series to advance the connected product indicator in accordance with the result of one multiplicand digit and the multiplier digit corresponding to that series; substantially as described.

79. In a calculating machine for mechanically attaining an indication of the product of any two factors of one or more digits up to the number provided for, a nonindenting adding mechanism comprising a plurality of result indicators of successive denominations, a plurality of non-indenting actuators and registering devices therefor, setting means for relatively positioning the actuators and registering devices in accordance with the digits of the multiplicand factor, transmitting connections permanently connecting the registering devices and result indicators, and operating mechanism selected in accordance with the denomination of each multiplier digit for operating a series of actuators to advance the result indicators connected to the respective registering devices in accordance with the product of the multiplicand factor and the multiplier digit corresponding to that series; substantially as described.

80. In a calculating machine for mechanically attaining an indication of the product of any two factors of one or more digits up to the number provided for, a nonindenting adding mechanism comprising a plurality of result indicators of successive denominations, a plurality of non-indenting actuators and registering devices therefor, setting means for relatively positioning the actuators and registering devices in accordance with the digits of the multiplicand factor, transmitting connections permanently connecting the registering devices and result indicators, and operating mechanism selected in accordance with the denomination of each multiplier digit for operating a series of actuators comprising a number thereof equal to the number of digits in the multiplicand factor to advance the result indicators connected to each registering device in accordance with the product of one multiplicand digit and the multiplier digit corresponding to that series; substantially as described.

In testimony whereof I affix my signature, in presence of two witnesses.

LEON W. ROSENTHAL.

Witnesses:
A. L. QUENEAU,
MINERVA LOBEL.